(12) United States Patent
Bourbakis et al.

(10) Patent No.: US 7,082,219 B2
(45) Date of Patent: Jul. 25, 2006

(54) METHOD AND APPARATUS FOR SEPARATING TEXT FROM IMAGES

(75) Inventors: Nicholas G. Bourbakis, Dayton, OH (US); Stanley E. Borek, New York Mills, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 757 days.

(21) Appl. No.: 10/314,483

(22) Filed: Dec. 5, 2002

(65) Prior Publication Data

US 2003/0152269 A1    Aug. 14, 2003

Related U.S. Application Data

(60) Provisional application No. 60/354,149, filed on Feb. 4, 2002.

(51) Int. Cl.
*G06K 9/00* (2006.01)
(52) U.S. Cl. ......................... 382/187; 382/175
(58) Field of Classification Search ................ 382/187, 382/175
See application file for complete search history.

(56) References Cited

U.S. PATENT DOCUMENTS

| 4,513,442 A | * | 4/1985 | Scherl | 382/176 |
| 5,335,290 A | * | 8/1994 | Cullen et al. | 382/176 |
| 5,724,445 A | * | 3/1998 | Niki | 382/177 |
| 5,852,676 A | * | 12/1998 | Lazar | 382/173 |

* cited by examiner

*Primary Examiner*—Joseph Mancuso
*Assistant Examiner*—Alex Liew
(74) *Attorney, Agent, or Firm*—Joseph A. Mancini

(57) ABSTRACT

The invention described herein provides a method and apparatus for document processing that efficiently separates and interrelates single modalities, such as text, handwriting, and images. In particular, the present invention starts with the recognition of text characters and words for the efficient separation of text paragraphs from images by maintaining their relationships for a possible reconstruction of the original page. The text separation and extraction is based on a hierarchical framing process. The process starts with the framing of a single character, after its recognition, continues with the recognition and framing of a word, and ends with the framing of all text lines. The method and apparatus described herein can process different types of documents, such as typed, handwritten, skewed, mixed, but not half-tone ones.

22 Claims, 19 Drawing Sheets

$S = (1,6)88788776554200$
$SL_1 = (1,6)88788 \implies N_1 = [(1,6),6,8,0]$
$SL_2 = 877 \implies N_2 = [(8),3,7,0]$
$SL_3 = 655 \implies N_3 = [(6),3,5,0]$
$SL_4 = 54 \implies N_4 = [(5),2,4,0]$
$SL_5 = 42 \implies N_5 = [(4),2,2,0]$ $$G = N_1 a^c{}_{12} N_2 a^c{}_{23} N_3 a^c{}_{34} N_4 a^c{}_{45} N_5 \# N_2 a^p{}_{23} N_3 \# N_1 a^p{}_{14} N_4$$

METHOD AND APPARATUS FOR SEPARATING TEXT FROM IMAGES

PRIORITY CLAIM UNDER 35 U.S.C. §119(e)

This patent application claims the priority benefit of the filing date of a provisional application, Ser. No. 60/354,149, filed in the United States Patent and Trademark Office on Feb. 4, 2002.

STATEMENT OF GOVERNMENT INTEREST

The invention described herein may be manufactured and used by or for the Government for governmental purposes without the payment of any royalty thereon.

BACKGROUND OF THE INVENTION

The recognition of printed and handwritten characters and words is an important research field with many applications existing in post offices for identifying the postal code from the addresses on the envelopes and sorting the mail, in banks for check processing, in libraries for computerizing the storage of books and texts, and also as reading devices for blind people, etc. Although many methodologies and systems have been developed for optical character recognition (OCR), OCR remains a challenging area. In particular, a good OCR system spends on the average about 2–3 seconds for the recognition of a handwritten character from a handwritten word. An extreme case is the OCR system by Loral, which is based on a very expensive parallel multiprocessor system of 1024 Intel-386 microprocessors, where each 386 CPU processes only one character at a time. There are also many OCR methods based on neural networks, such as the AT&T Bell labs OCR chip, the multiple Neural Networks OCR approach, etc. There are some other OCR methods based on human like recognition. One of them uses a fuzzy graph based OCR approach, with adaptive learning capabilities, which reduces the character dimensions to speed up the recognition process. It scans the text page, detects a character, extracts and recognizes it, produces the appropriate ASCII code, and sends it to the host computer in a few milliseconds simulated average test time. Image Processing and Pattern Recognition (IPPR) are two older research fields with many significant contributions. The recognition and extraction of objects from images is a small sub-field of IPPR. There are many successful methods based on neural nets or graphs to recognize different kind of objects (faces, cars, chairs, tables, buildings, etc) under very noisy conditions.

Recently, attention has been focused on the document processing field due to multimedia applications. Although document processing is an interesting research field, it introduces many difficult problems associated with the recognition of text characters from images. For instance, there are cases where a document can be considered either as text or as image, like images generated by text characters. Also, artistic letters in very old and valuable books, where the starting letter of each paragraph look like a complex image. In some cases, however, the text is handwritten, and the problem becomes more difficult. Several methods have been developed for document processing. Most of these methods deal with the segmentation of a page and the separation of text from images. One prior art method is a "top-down" approach and produces good results under the condition that the examined page can be separated into blocks. Another prior art method is algorithmic "bottom up" process with good performance in several categories of pages with good spacing features, and "non overlapping" blocks. Yet another prior art method exists and is also a "bottom up" process with very good performance especially in long text uniform strings. Still another prior art method exists that separates images from text (typed or handwritten) by maintaining their relationships.

OBJECTS AND SUMMARY OF THE INVENTION

One object of the present invention is to provide a method and apparatus for processing documents by separating text from images yet maintaining their relationship for reconstruction.

Another object of the present invention is to provide a method and apparatus for recognizing single characters, words, and lines of text.

Yet another object of the present invention is to provide a method and apparatus for recognizing typed as well as handwritten words and letters.

The invention described herein provides a method and apparatus for document processing that efficiently separates and interrelates single modalities, such as text, handwriting, and images. In particular, the present invention starts with the recognition of text characters and words for the efficient separation of text paragraphs from images by maintaining their relationships for a possible reconstruction of the original page. The text separation and extraction is based on a hierarchical framing process. The method starts with the framing of a single character, after its recognition, continues with the recognition and framing of a word, and ends with the framing of all text lines. The method and apparatus described herein can process different types of documents, such as typed, handwritten, skewed, mixed, but not half-tone ones.

According to an embodiment of the present invention, method for separating text from images, comprises the steps of: a first step of scanning a binarized page of text so as to detect a character; a first step of creating a temporal window on the binarized page and a second step of scanning the temporal window so as to extract a character shape; graphing line segments; recognizing and framing a character; a first step of connecting adjacent character frames in the same word; a second step of creating multi-frame word blocks; recognizing hand-written words; a second step of connecting word frames; saving the coordinates of lines of text and paragraphs on a given page; and extracting images from a page.

DETAILED DESCRIPTION OF THE PREFERRED EMBODIMENT

Binarization & Character Detection

Figure 1A:
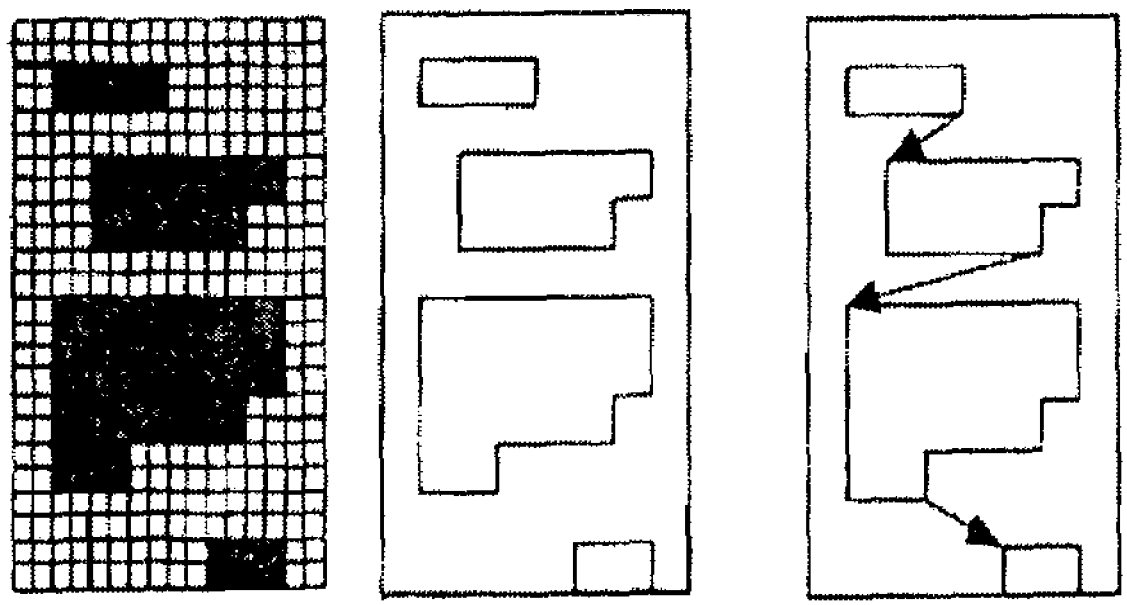
FIG. 1A graphically depicts the scanning of a binarized page of text.
Figure 1B:
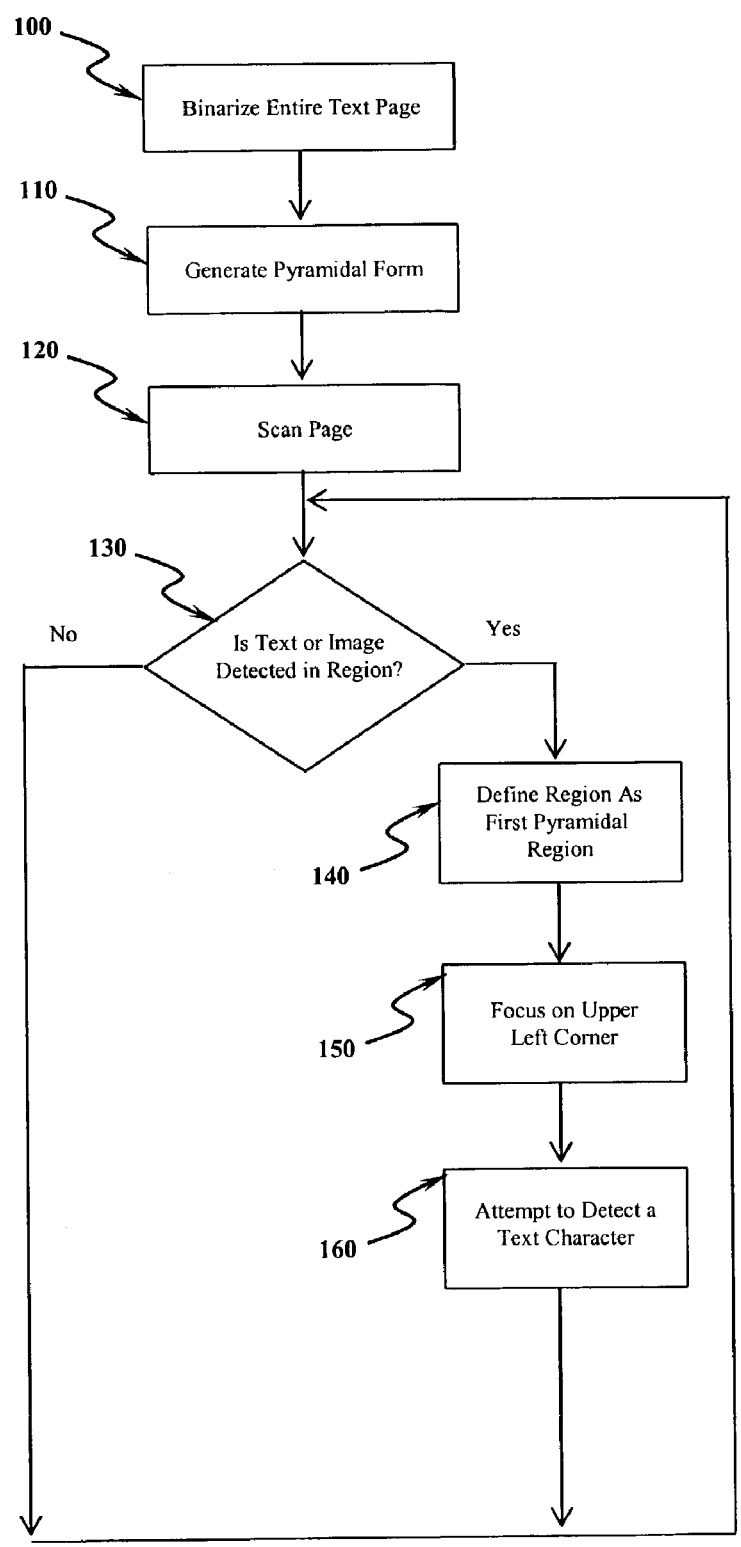
FIG. 1B depicts the method steps for scanning and detecting a character within a binarized page of text.

Referring to FIG. 1A and FIG. 1B, the entire text page is initially binarized 100 and its pyramidal form is generated 110. A "pyramidal" representation of a 2D array (i.e., an image of a document page in the present invention) is the hierarchically reduced representations of the array from the original representation comprising N×N pixels, to the final representation comprising 1×1 pixels. All such diminishing array representations (or layers) portray a "pyramidal" structure of reduced size in layers. Then the page area is scanned 120 for the isolation and interrelation of informative regions $R_k(ij)$, $k \in Z$, with text or images. When the first top "informative" region $R_1$—a region with text or image—is detected 130, the methodology defines that particular region at the "first pyramidal" level 140 (i.e., the "first pyramidal" level in the present invention is the original page of N×N pixels) and focuses 150 on the upper left corner of the region to detect a text character 160, if possible.

Character Recognition

Figure 2A:
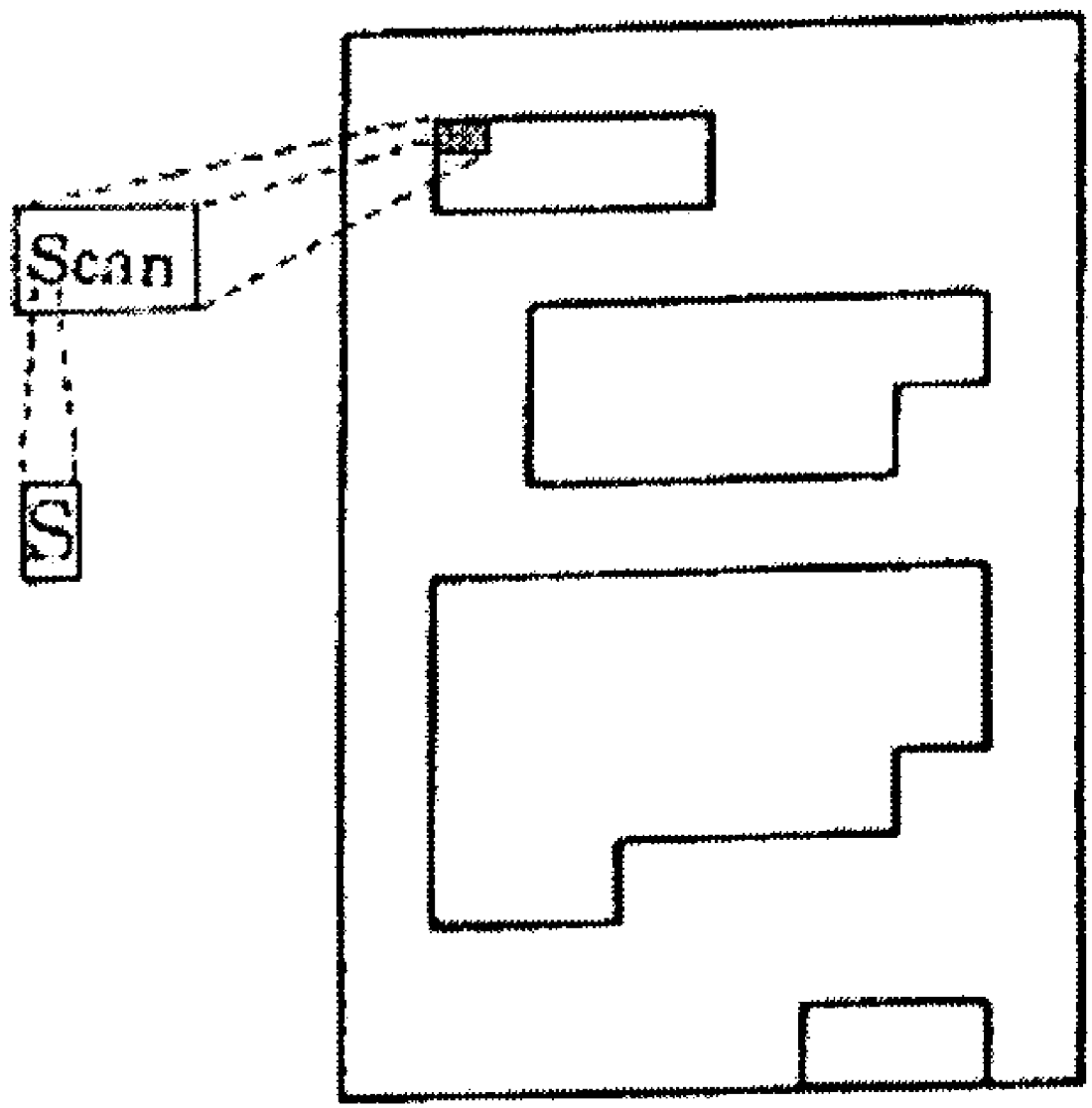
FIG. 2A graphically depicts the temporal window created on a page of binarized text.
Figure 2B:
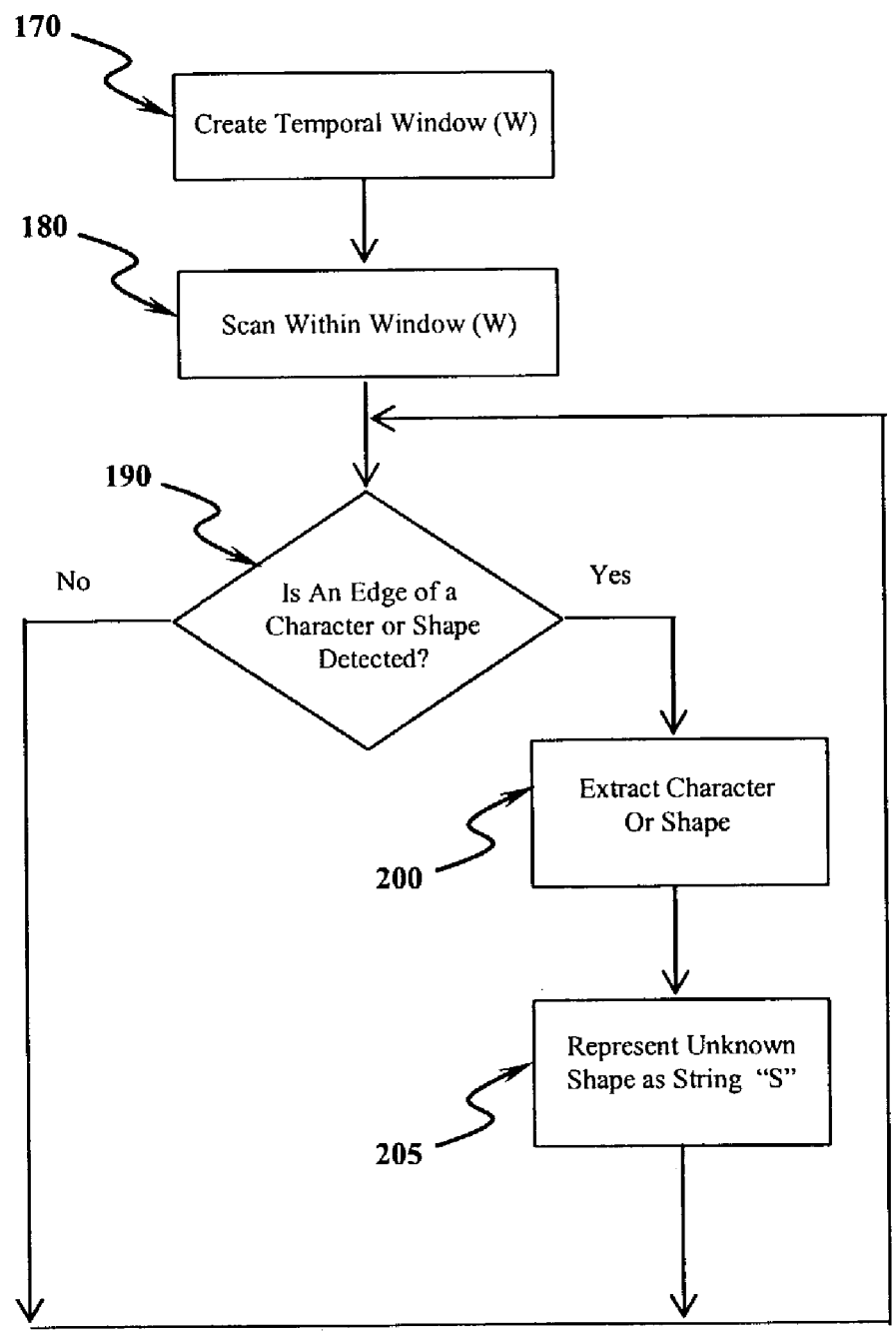
FIG. 2B depicts the method steps for scanning within a temporal window and extraction of a character shape.

Referring to FIG. 2A and FIG. 2B, the character recognition process starts with the creation of a temporal window 170 Wnxm, of nxm pixels. This window W covers the upper left area of the actual (in size) region $R_1$. A scanning process takes place 180 within window Wnxm, to detect the edges of possible character or the shape of an unknown object. When an edge is detected 190, a Chain Code (CC) method is used to extract the shape 200 of the unknown character or object. The "unknown" shape extracted by the CC method is represented 205 as a string S:

$$S = cn_{k1}(dj_{k1})n_{k2}(dj_{k2}) \ldots cn(dj_{ll}) \ldots n_{lm}(dj_{lm})cc$$

where $n_{km} \in Z$, $dj_{km} \in \{1,2,3,4,5,6,7,8\}$, c=0, cc=9, and i,j,k,l,m∈Z.

Figure 3A:
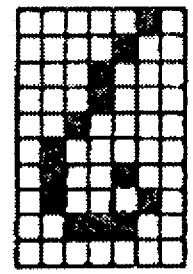
FIG. 3A graphically depicts a graph of line segments.
Figure 3B:
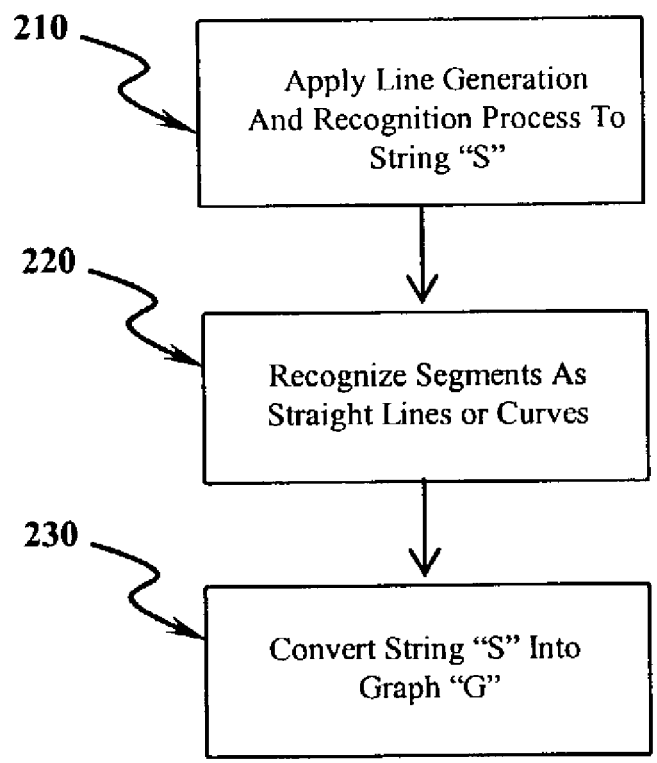
FIG. 3B depicts the method steps for graphing line segments.

Referring to FIG. 3A and FIG. 3B, a line generation and recognition process is applied 210 on the string S and its segments are recognized 220 either as straight lines (SL) or as curved lines (CL). At this point the present invention converts 230 a string S into a graph G:

$$f: S \to G = N_1 a^r_{12} N_2 a^r_{23} N_3 \ldots a^r_{nk} N_k$$

where a line segment (SL or CL) corresponds to a graph node:

$$f: SL_i \to N_i \text{ or } CL_j \to N_i$$

where each graph node $N_i$ represents the properties of the corresponding segment:

$N_i$={Realtive Starting Point (SP), Length (L), Direction (D), Curvature (K)} and each are $a^r_{ij}$ represents the relationships between segments:

$a^r_{ij}$={connectivity (co), parallelism (p), symmetry (sy), relative size (rs), relative distance (rd), relative orientation (ro), similarity (si), ... }, r ∈{co, p, sy, rm, rd, si}

For the actual matching process, each node $N_i$ has only property in the curvature (K).

Figure 4A:
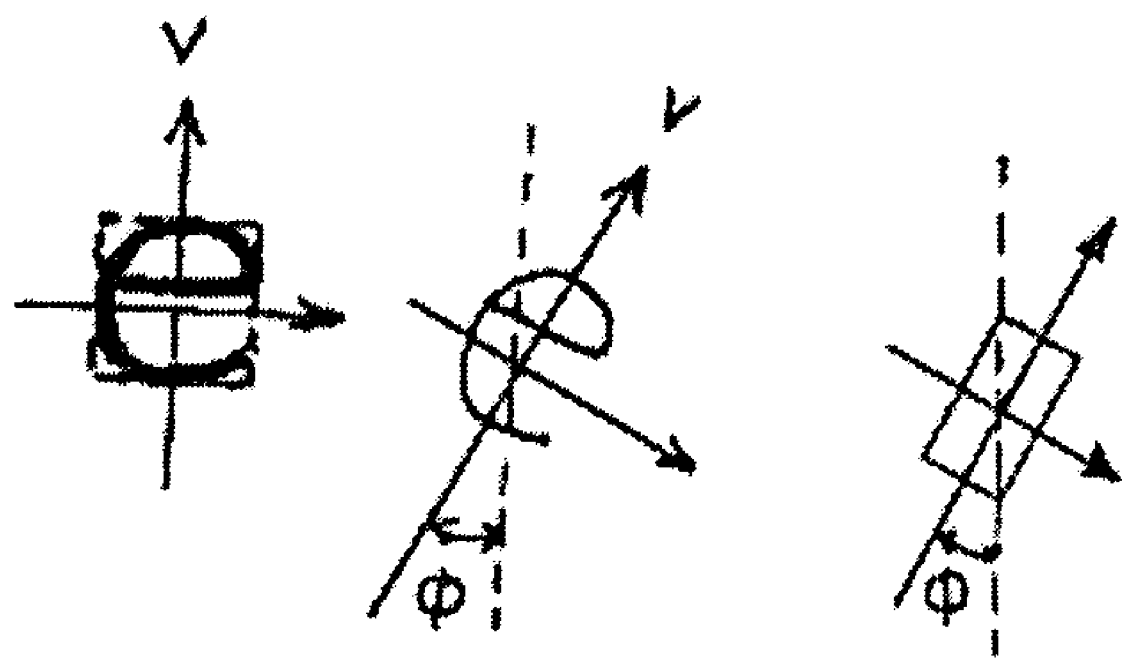
FIG. 4A graphically depicts recognition and framing of a character.
Figure 4B:
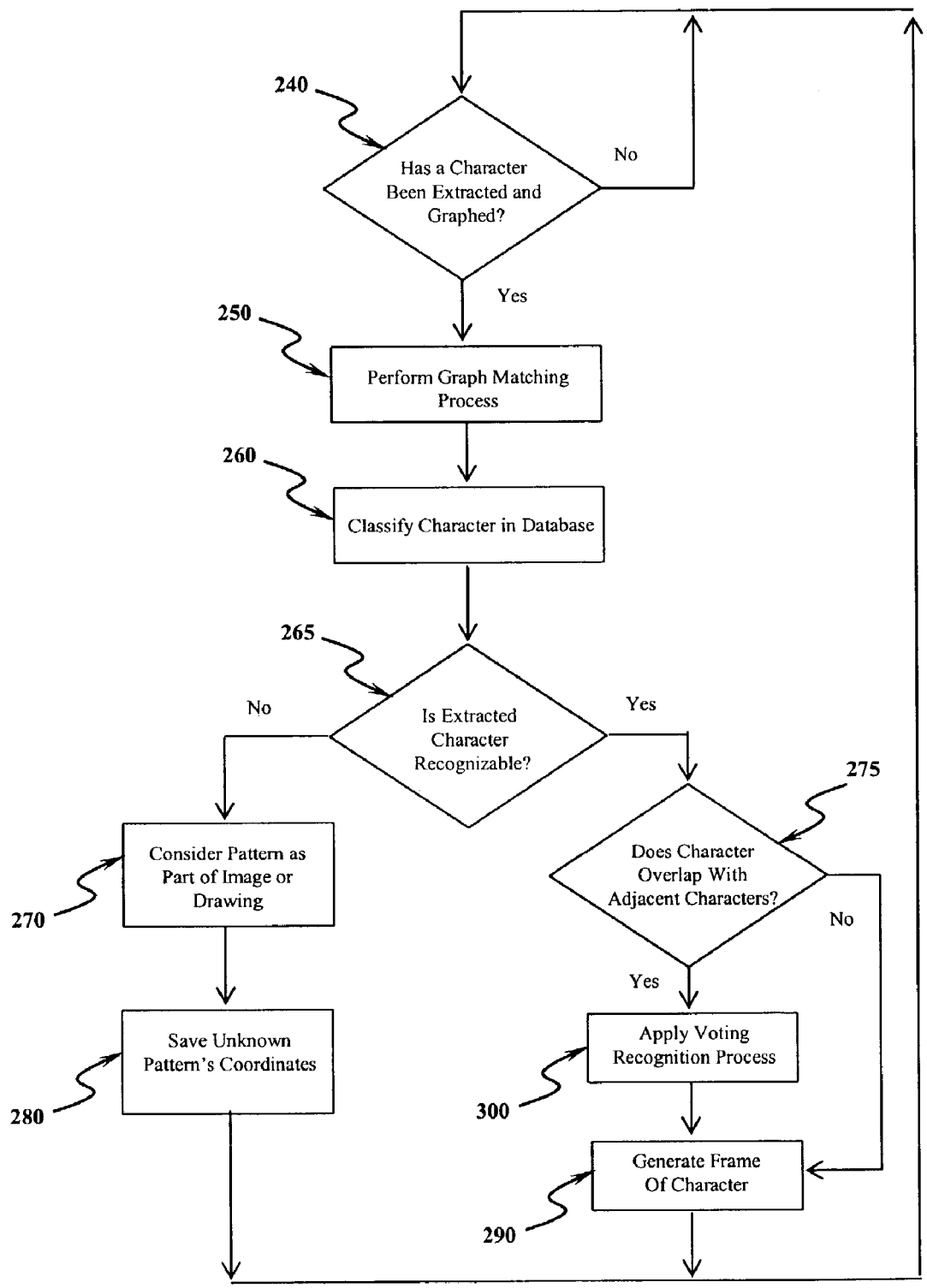
FIG. 4B depicts the method steps for recognizing and framing a character.

Referring to FIG. 4A and FIG. 4B, in the event that a text character is extracted 240 and represented in a graph form, a fuzzy graph matching process takes place 250 within a graph data base to classify 260 the character. The classification of a character is associated with attributes, such as orientation, size, and font. If, however, the extracted pattern is not recognizable 265, the present invention considers it as a possible piece of an image or drawing 270. Thus, the present invention saves the unknown pattern's coordinates 280 and continues the extraction 240 of the next pattern. If the new extracted pattern is also unrecognizable as a text character 240, the present invention repeats its attempts until it covers that particular informative region, by generating a block (or blocks) of non-text patterns and saving each block's coordinates 280 for future reconstruction.

Character Framing

Figure 5:
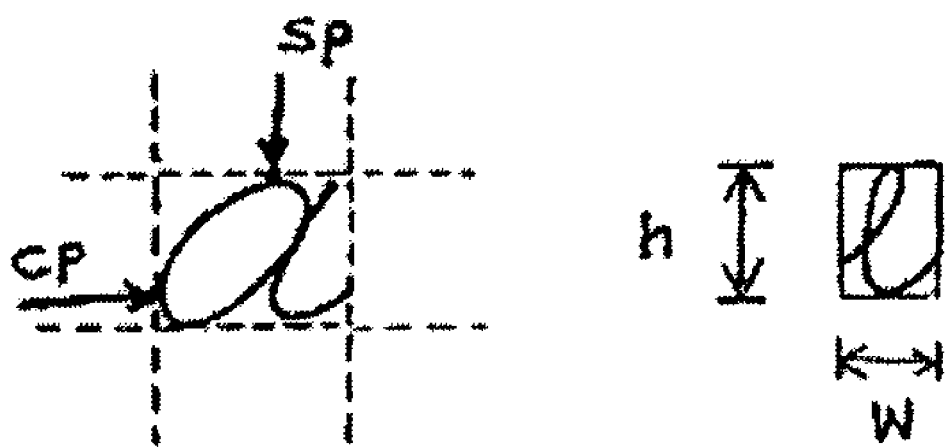
FIG. 5 graphically depicts the framing of a character.

Referring to FIG. 5, when a particular character is recognized by the present invention, its attributes are used for the generation of its frame 290 (see FIG. 4B). This a flexible process since it provides the ability to frame characters with different skews and size. FIG. 5 shows the framing of a character by using the maximum points sp (for top) and cp (for left side), and the frames of different size characters. If it is determined that a particular character has overlapping parts with adjacent characters 275 (see FIG. 4B), a voting recognition process is used to appropriately recognize it 300 (see FIG. 4B).

Connecting Character Frames

Figure 6A:
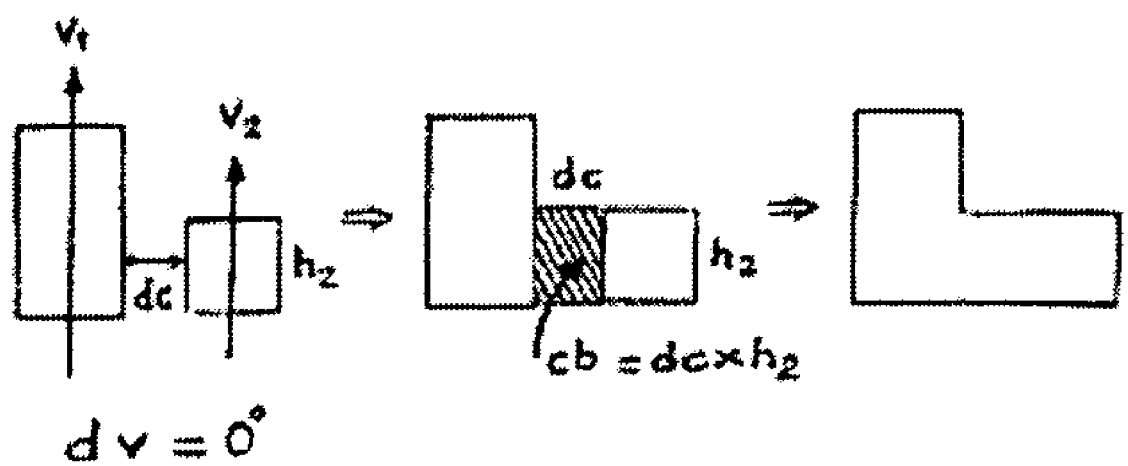
FIG. 6A graphically depicts the connection of adjacent character frames in the same word.
Figure 6B:
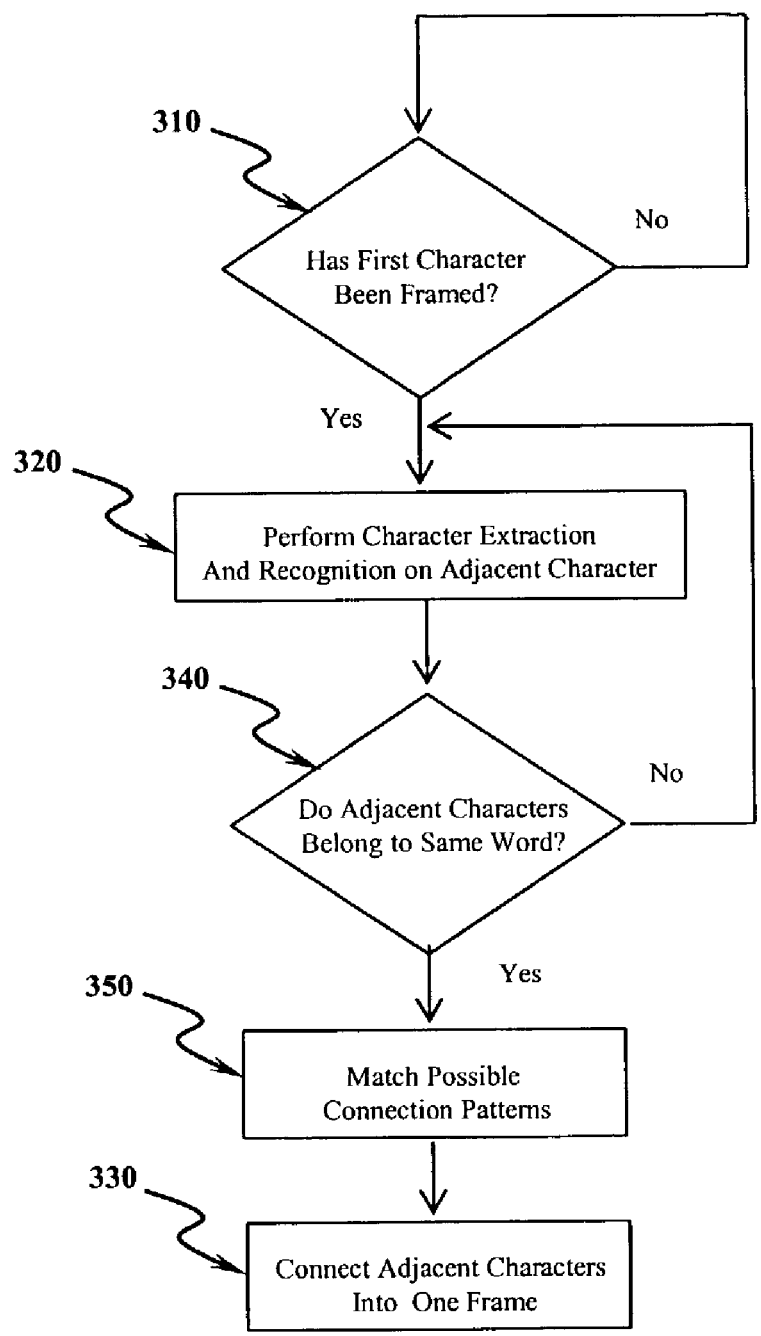
FIG. 6B depicts the method steps for connecting adjacent character frames in the same word.
Figure 7:
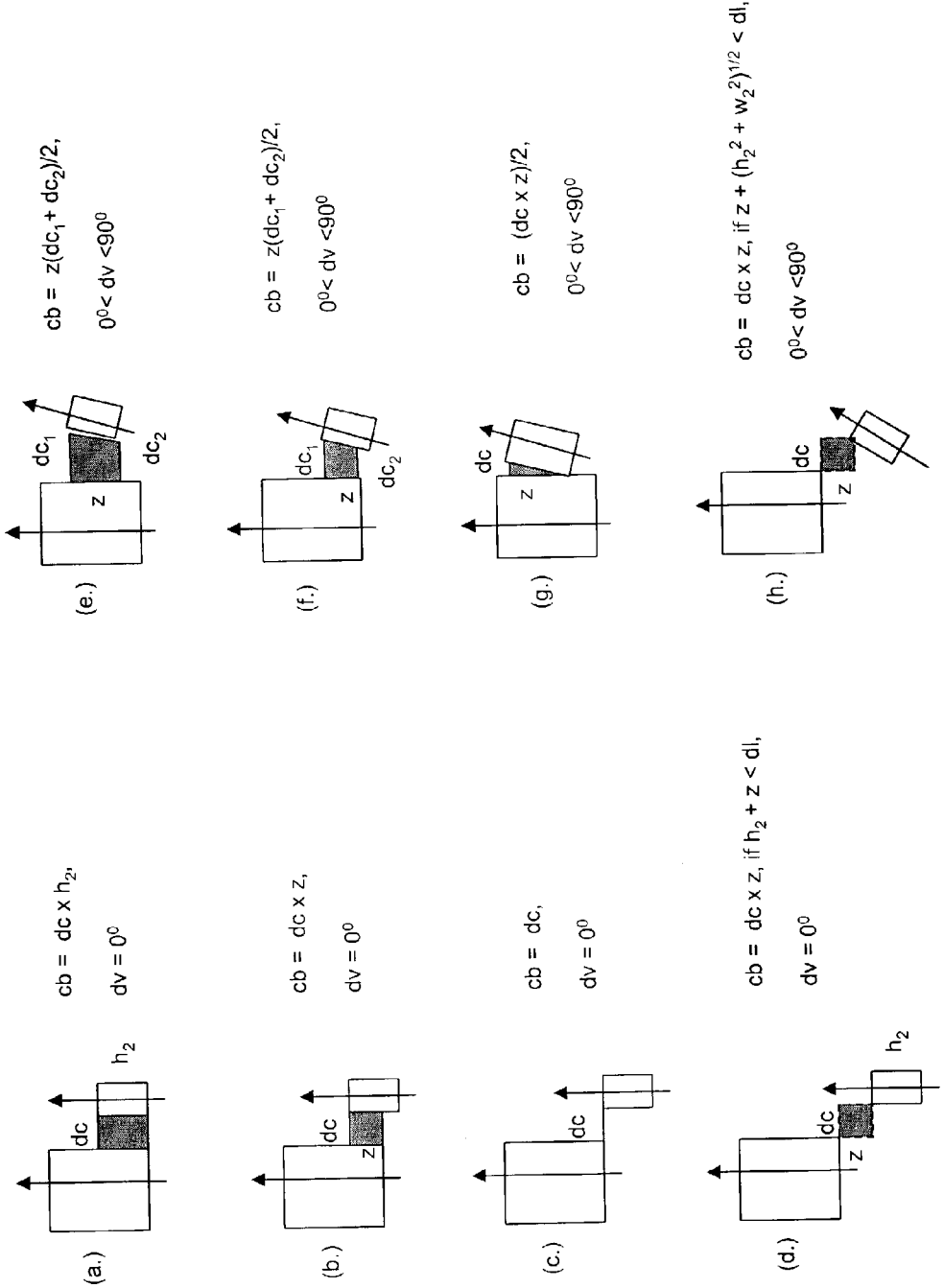
FIG. 7 graphically depicts the eight possible connection patterns for adjacent character frames of the same word.

Referring to FIG. 6A and FIG. 6B, when the framing of the first character is completed 310, the character extraction and recognition process is repeated 320 with the next neighboring character which has the same or different orientation (v) with the previous one. Thus, after the framing of the next character, the present invention connects these two frames into one 330, once it has been determined that they belong to the same word 340. The connection (or synthesis) of two frames (see FIG. 6A) starts with the use of the frames orientations ($v_i$, $v_j$, i,j∈Z+) to match 350 one of the eight possible connection patterns (see FIG. 7). The present invention assumes that two consecutive characters belong to the same word if the distance between them is equal or smaller than (dc), where dc is a predefined parameter. The connection block (cb) is generated by the projection of $h_i$ into the other frame's high $h_j$. Thus, the shape of cb varies according to the orientations of these two frames.

Word Framing

Figure 8A:
FIG. 8A graphically depicts the creation of a multi-frame word block.
Figure 8A:
Figure 8B:
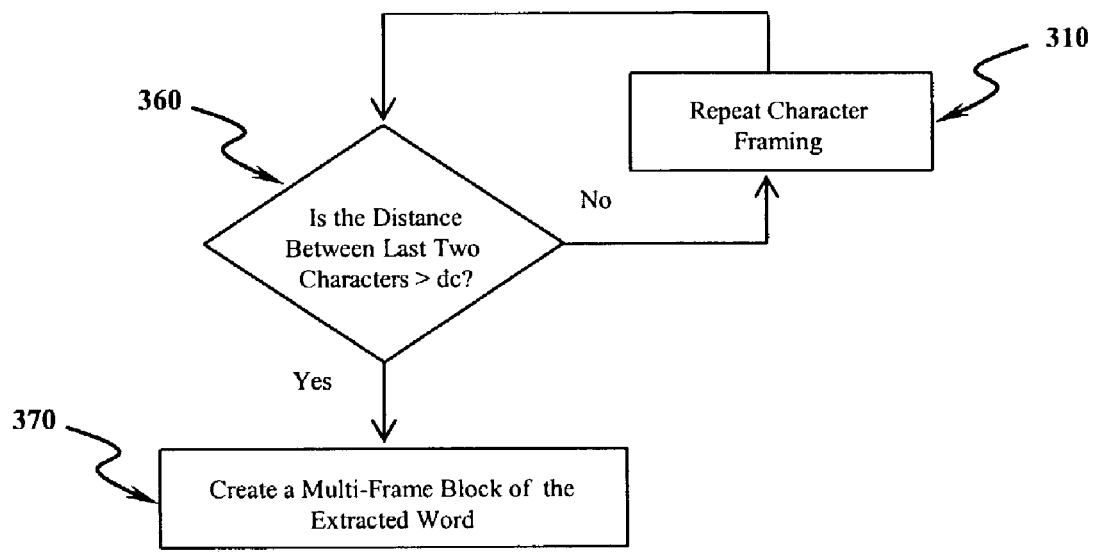
FIG. 8B depicts the method steps for creating a multi-frame word block.

Referring to FIG. 8A and FIG. 8B, the present invention repeats character framing 310 (also see FIG. 4B) until it is determined 360 that the distance between the last two consecutive characters is greater than dc. Thus, at the end of this step, the present invention creates a multi-frame block 370 for the extracted word by using the character frames and their projections to each other, FIG. 8A shows graphically the synthesis of frames and connection blocks by using the eight possible connection patterns (see FIG. 7). In particular, frame (W) is connected to the frame (h) by using connection pattern "e", frame (h) is connected to the frame (e) using connection pattern "e", frames (e) and (r) use connection pattern "b", and frames (r) and (e) use connection pattern "a".

Word Recognition

Figure 9A:
FIG. 9A graphically depicts the recognition of handwritten words.
Figure 9B:
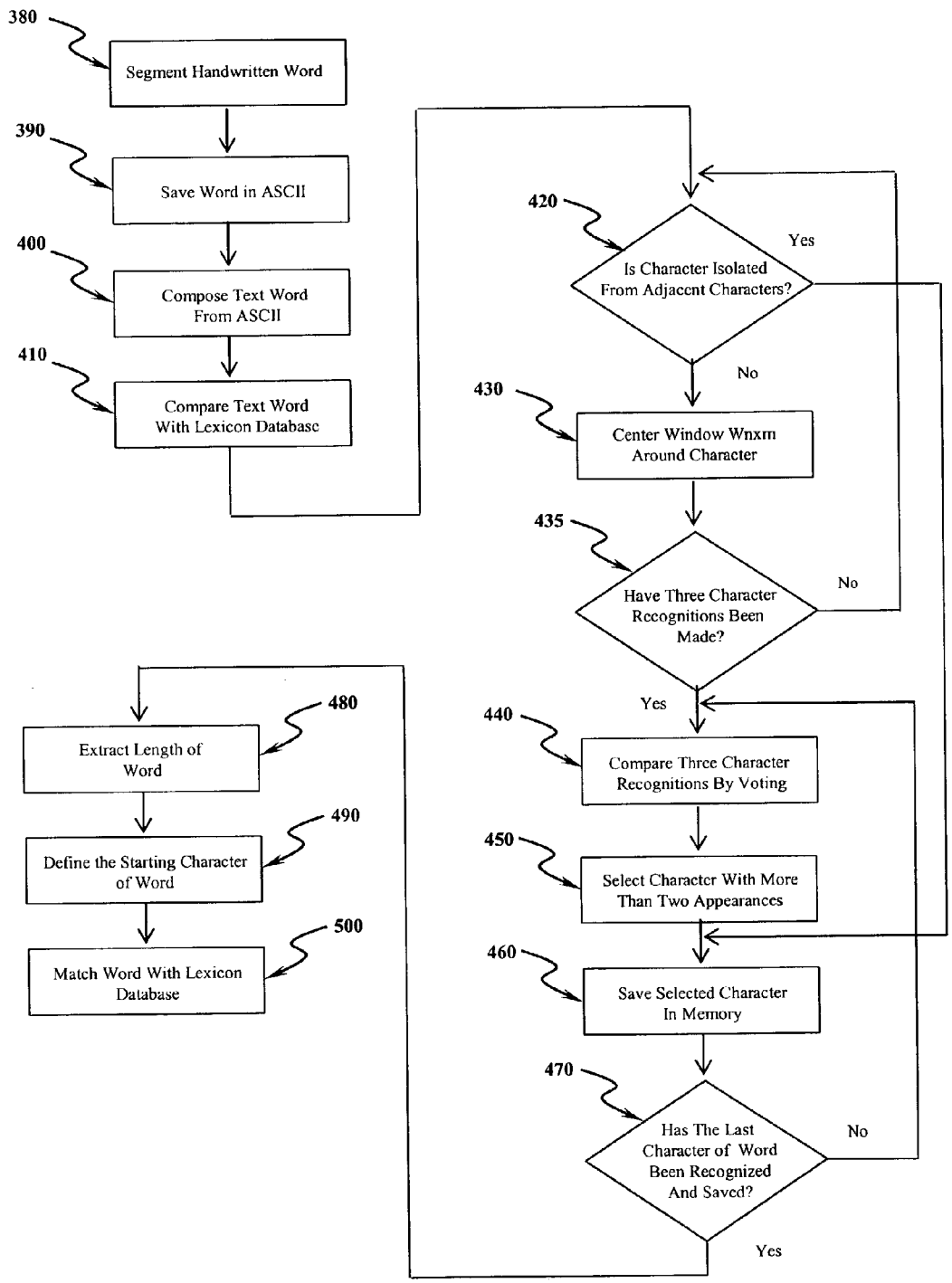
FIG. 9B depicts the method steps for recognizing handwritten words.

Referring to FIG. 9A and FIG. 9B, the present invention has the ability to recognize handwritten words by appropriately segmenting them 380 and temporarily saving 390 their recognizable ASCII codes. It then composes 400 these codes into text words and compares 410 them with the contents of the lexicon database. If it is determined that a character is not isolated from the adjacent characters 420, due to overlapping and/or underlining, the present invention moves the window Wnxm into three positions (left, center, right, see table-1) around the character 430 and each time a character recognition is performed. This means that three character recognition attempts are made 435 for a possible single character, in an effort to optimize the correct recognition of each character and the "best" segmentation of the examined word. The three recognizable character outputs are compared 440 in a voting section and the character with more than two appearances is selected 450 as the one with the higher probability. At the end of this process, the selected character is saved in the memory 460. The same process is repeated until it is determined 470 that the "last" character of the examined word has been recognized and saved in the memory. At this point the present invention extracts the length of that particular word 480, defines the starting character (if possible) 490 and attempts a fuzzy matching process with the known words in the lexicon database 500. As a result of this matching process, a number of words associated with their matching probability are retrieved from the lexicon database. Thus, the word with the highest probability (if any) is selected as the correct one. The word given in FIG. 9A, the fuzzy matching to lexicon database, provides as a first choice the word "animation" (55%) and second choice the word "animosity" (11%). It has been shown that the word recognition process has an 89% success on different styles of handwritten words.

Text Line Framing

Figure 10:
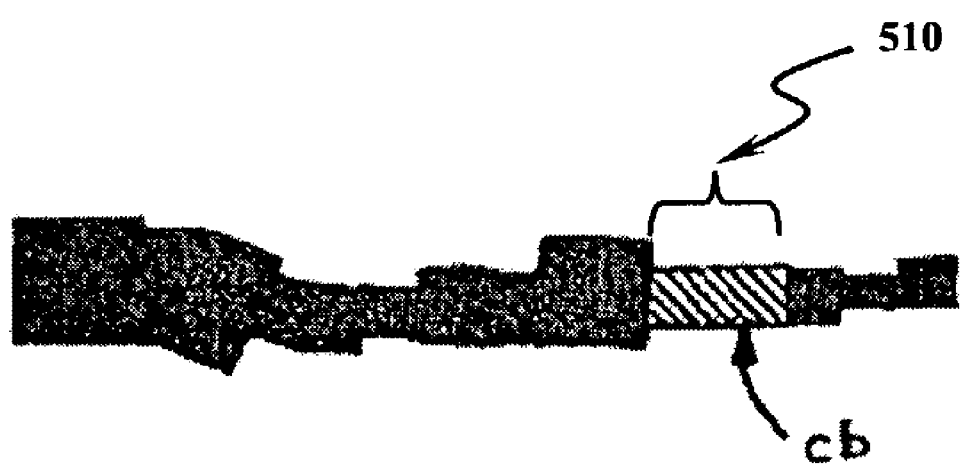
FIG. 10 depicts graphically the connection of word frames.

Referring to FIG. 10, the connection of word frames follows a similar procedure, like the connection of character frames, by connecting 510 the last frame of each word with the first frame of the next one. Thus, a text line frame may be a multi-skew block, which covers only the characters frames and the space of the connection blocks.

Connecting and Extracting Text Line Frames

Figure 11:
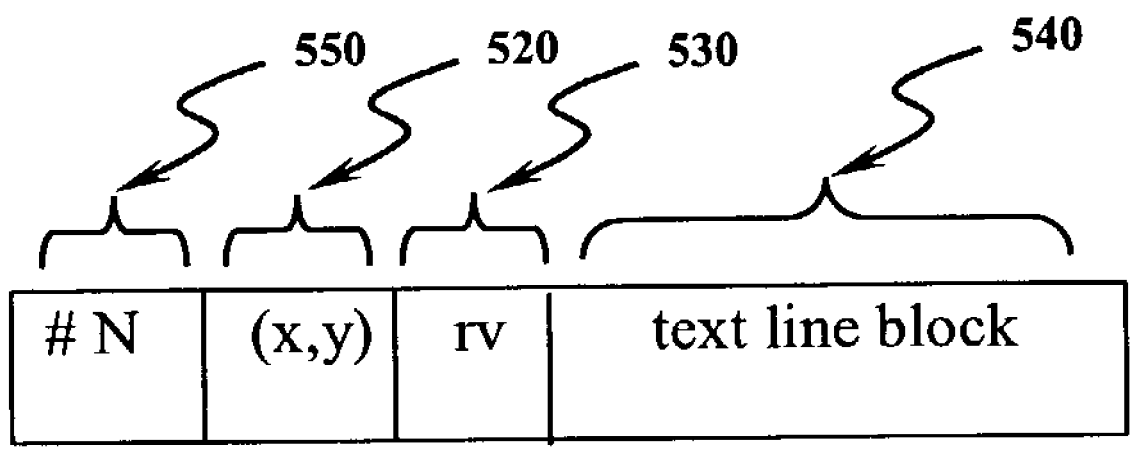
FIG. 11 depicts graphically saving the coordinates of lines of text and paragraphs on a given page.

Referring to FIG. 11, in order to extract text lines from a document, it is necessary to save the coordinates (x,y) 520 and the relative orientation (rv) 530 of the first character frame of each text line relative to the borders of the document page. Thus, the framing and the extraction of paragraphs or the entire text of a document page is obtained by interrelating the extracted text line blocks 540 with numbers (#N) 550 according to their relative positions on the document page.

Extracting Images

Figure 12:
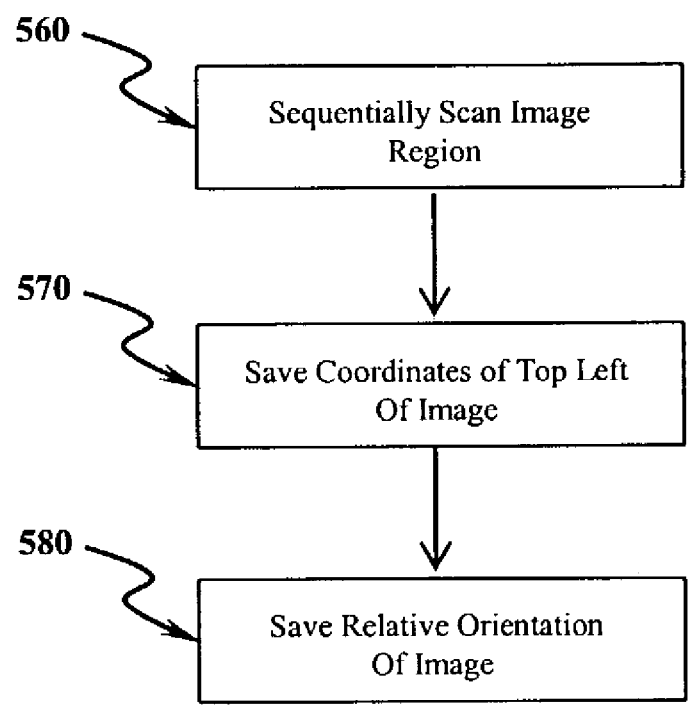
FIG. 12 depicts the method steps for extracting an image from a page.

Referring to FIG. 12, the extraction of the images is based on a sequential scanning of the image region 560, by saving the coordinates (X,Y) of the upper left top pattern 570 and its relative orientation (RV) 580 regarding with the borders of the document page.

While the preferred embodiments have been described and illustrated, it should be understood that various substitutions, equivalents, adaptations and modifications of the invention may be made thereto by those skilled in the art without departing from the spirit and scope of the invention. Accordingly, it is to be understood that the present invention has been described by way of illustration and not limitation.

What is claimed is:

1. Method for separating text from images, comprising the steps of:
    binarizing an entire page of text;
    a first step of scanning said binarized page of text so as to detect a character, wherein said first step of scanning further comprises:
        generating the pyramidal form of said page;
        scanning said page for text or images;
        determining whether either text or images are detected;
        IF either text or images are detected, THEN:
            defining region as the first pyramidal region;
            focusing on the upper left corner of said region;
            attempting to detect a text character; and
            returning to said step of determining whether either text or images are detected;
        OTHERWISE,
            determining whether either text or images are detected;
    a first step of creating a temporal window on said binarized page and a second step of scanning said temporal window so as to extract a character shape;
    graphing line segments;
    recognizing and framing a character;
    a first step of connecting adjacent character frames in the same word;
    a second step of creating multi-frame word blocks;
    recognizing hand-written words;
    a second step of connecting word frames, further comprising
        connecting the last frame of each word with the first frame of the next word;
    saving the coordinates of lines of text and paragraphs on a given page; and
    extracting images from a page.

2. Method of claim 1, wherein said first step of creating a temporal window and said second step of scanning said temporal window further comprises the steps of:
    creating a temporal window;
    scanning within said window so as to detect the edges of a character or shape of an object;
    determining whether an edge of a character or shape of an object is detected;
        IF an edge of a character or shape of an object is detected, THEN:
            extracting the shape of said character or said object;
            representing said shape as a string "S"; and
            returning to said step of determining whether an edge of a character or shape of an object is detected;
        OTHERWISE,
            returning to said step of determining whether an edge of a character or shape of an object is detected.

3. Method of claim 1, wherein said step of graphing further comprises the steps of:

applying line generation and recognition process to string "S";
recognizing segments of said string "S" as straight lines or curves; and
converting said string "S" into a graph "G".

4. Method of claim 1, wherein said step of recognizing and framing a character further comprise the steps of:
determining whether a character has been extracted and graphed;
IF it is determined that a character has been extracted and graphed,
THEN:
performing graph matching;
classifying said character in a database;
OTHERWISE,
returning to said step of determining whether a character has been extracted and graphed;
determining whether said extracted character is recognizable;
IF said extracted character is recognizable, THEN:
determining whether said character overlaps with adjacent characters;
IF it is determined that said character overlaps with adjacent characters, THEN:
applying a voting recognition process;
generating a frame of said character; and
returning to said step of determining whether a character has been extracted and graphed;
OTHERWISE,
advancing to said step of generating a frame of said character;
OTHERWISE,
considering pattern as part of an image or drawing;
caving said pattern's coordinates; and
returning to said step of determining whether a character has been extracted and graphed.

5. Method of claim 1, wherein said first step of connecting adjacent character frames in the same word further comprises steps of:
determining whether the first character has been framed;
IF it is determined that the first character has been framed, THEN:
performing character extraction and recognition on adjacent character;
determining whether adjacent characters belong to the same word;
IF it is determined that adjacent characters belong to the same word, THEN:
matching possible connection patterns; and
connecting adjacent characters into one frame,
OTHERWISE,
repeating said step of determining whether first character has been framed.

6. Method of claim 1, wherein said second step of creating multi-frame word blocks further comprises the steps of:
determining whether the distance between the last two characters is greater than "dc";
IF said distance is greater than "dc", THEN:
creating a multi-frame block of the extracted word,
OTHERWISE,
repeating character framing; and
returning to said step of determining whether the distance between the last two characters is greater than "dc".

7. Method of claim 1, wherein said step of recognizing hand-written words further comprises the steps of:
segmenting said hand-written word;
saving said word in ASCII format;
composing a text word from said ASCII format;
comparing said text word with lexicon database;
determining whether a character is NOT isolated from adjacent characters;
IF said character is NOT isolated, THEN:
centering window $W_{nxm}$ around said character;
determining whether three character recognitions have been made;
IF three said recognitions have been made, THEN:
comparing said three character recognitions by voting;
selecting said character with more than two appearances;
saving selected character in memory; and
determining whether the last said character of a said word has been recognized and saved;
IF said last character has been recognized and saved, THEN:
extracting length of said word;
defining the starting character of said word; and
matching said word with lexicon database;
OTHERWISE;
returning to said step of comparing said three character recognitions by voting;
OTHERWISE;
returning to said step of determining whether a character is NOT isolated from adjacent characters;
OTHERWISE;
proceeding to said step of saving said selected character in memory.

8. Method of claim 1, wherein said step of saving the coordinates of lines of text and paragraphs on a given page further comprises the steps of:
saving the coordinates (x,y) and the relative orientation (rv) of the first character frame of each text line relative to the borders of the document pages; and
interrelating the blocks of said extracted lines of text with numbers according to their relative positions on said document page.

9. Method of claim 1, wherein said step of extracting images from a page further comprises the steps of:
sequentially scanning said image region;
saving said coordinates (c,y) of said image; and
saving said relative orientation (rv) of said image.

10. Method of claim 1, wherein said string "S" is represented by:

$$S=cn_{k1}(dj_{k1})n_{k2}(dj_{k2})\ldots cn(dj_{ll})\ldots n_{bm}(dj_{bm})cc$$

wherein $n_{km} \in Z$, $dj_{km} \in \{1,2,3,4,5,6,7,8\}$, c=0, cc=9, and i,j,k,l,m $\in$ Z.

11. Method of claim 2, wherein said step of converting said string "S" into graph "G" is represented by:

$$f:S \to G = N_1 a^r_{12} N_2 a^r_{23} N_3 \ldots a^r_{nk} N_k;$$

wherein said line segment (SL or CL) corresponds to a graph node:

$$f:SL_i \to N_i \text{ or } CL_j \to N_j;$$

wherein each said graph node $N_i$ represents the properties of the corresponding segment:
$N_1$={Realtive Starting Point (SP), Length (L), Direction (D), Curvature (K)};
wherein each are $a^r_{ij}$ represents the relationships between segments:

$a^r_{ij}$={connectivity (co), parallelism (p), symmetry (sy), relative size (rs), relative distance (rd), relative orientation (ro), similarity (si), . . . }, $r \in$ {co, p, sy, rm, rd, si}; and wherein the actual matching process, each said node $N_i$ has only property in the curvature (K).

12. Apparatus for separating text from images, comprising:
  means for binarizing an entire page of text;
  a first means for scanning a binarized page of text so as to detect a character,
  wherein said first means for scanning further comprises:
    means for generating the pyramidal form of said page;
    means for scanning said page for text or images;
    means for determining whether either text or images are detected;
    IF either text or images are detected, THEN said first means for scanning further comprises:
      means for defining region as the first pyramidal region;
      means for focusing on the upper left corner of said region;
      means for attempting to detect a text character; and
      means for returning to said means for determining whether either text or images are detected;
    OTHERWISE, said first means for scanning further comprises:
      means for determining whether either text or images are detected;
  a first means for creating a temporal window on said binarized page and a second means for scanning said temporal window so as to extract a character shape;
  means for graphing line segments;
  means for recognizing and framing a character;
  a first means for connecting adjacent character frames in the same word;
  a second means for creating multi-frame word blocks;
  means for recognizing hand-written words;
  a second means for connecting word frames, further comprising
    means for connecting the last frame of each word with the first frame of the next word;
  means for saving the coordinates of lines of text and paragraphs on a given page; and
  means for extracting images from a page.

13. Apparatus as in claim 12, wherein said first means for creating a temporal window and said second means for scanning said temporal window further comprise:
  means for creating a temporal window;
  means for scanning within said window so as to detect the edges of a character or shape of an object;
  means for determining whether an edge of a character or shape of an object is detected;
    IF an edge of a character or shape of an object is detected, THEN, said second means for scanning said temporal window further comprises:
      means for extracting the shape of said character or said object;
      means for representing said shape as a string "S"; and
      means for returning to said step of determining whether an edge of a character or shape of an object is detected;
    OTHERWISE, said second means for scanning said temporal window further comprises:
      means for re-implementing said means for determining whether an edge of a character or shape of an object is detected.

14. Apparatus as in claim 12, wherein said means for graphing further comprises:
  means for applying line generation and recognition process to string "S";
  means for recognizing segments of said string "S" as straight lines or curves; and
  means for converting said string "S" into a graph "G".

15. Apparatus as in claim 12, wherein said means for recognizing and framing a character further comprises:
  means for determining whether a character has been extracted and graphed;
    IF it is determined that a character has been extracted and graphed,
    THEN, said means for recognizing and framing a character further comprises:
      means for performing graph matching;
      means for classifying said character in a database;
    OTHERWISE, said means for recognizing and framing a character further comprises:
      means for returning to said step of determining whether a character has been extracted and graphed;
  means for determining whether said extracted character is recognizable;
    IF said extracted character is recognizable, THEN, said means for recognizing and framing a character further comprises:
      means for determining whether said character overlaps with adjacent characters;
      IF it is determined that said character overlaps with adjacent characters, THEN, said means for recognizing and framing a character further comprises:
        means for applying a voting recognition process;
        means for generating a frame of said character; and
        mean for re-implementing said means for determining whether a character has been extracted and graphed;
      OTHERWISE, said means for recognizing and framing a character further comprises:
        means for advancing to said step of generating a frame of said character;
    OTHERWISE, said means for recognizing and framing a character further comprises:
      means for considering pattern as part of an image or drawing;
      means for saving said pattern's coordinates; and
      means for re-implementing said means for determining whether a character has been extracted and graphed.

16. Apparatus as in claim 12, wherein said first means for connecting adjacent character frames in the same word further comprises:
  means for determining whether the first character has been framed;
    IF it is determined that the first character has been framed, THEN, said first means for connecting adjacent character frames in the same word further comprises:
      means for performing character extraction and recognition on adjacent character;
      means for determining whether adjacent characters belong to same word;
      IF it is determined that adjacent characters belong to the same word, THEN, said first means for connecting adjacent character frames in the same word further comprises:

means for matching possible connection patterns; and
connecting adjacent characters into one frame,
OTHERWISE, said first means for connecting adjacent character frames in the same word further comprises:
means for returning to said step of performing character extraction and recognition on adjacent character;
OTHERWISE, said first means for connecting adjacent character frames in the same word further comprises:
means for repeating said step of determining whether first character has been framed.

17. Apparatus as in claim 12, wherein said second means for creating multi-frame word blocks further comprises:
means for determining whether the distance between the last two characters is greater than "dc";
IF said distance is greater than "dc", THEN, said second means for creating multi-frame word blocks further comprises:
means for creating a multi-frame block of the extracted word,
OTHERWISE, said second means for creating multi-frame word blocks further comprises:
means for repeating character framing; and
means for re-implementing said means for determining whether the distance between the last two characters is greater than "dc".

18. Apparatus as in claim 12, wherein said means for recognizing hand-written words further comprises:
means for segmenting said hand-written word;
means for saving said word in ASCII format;
means for composing a text word from said ASCII format;
means for determining whether a character is NOT isolated from adjacent characters;
IF said character is NOT isolated, THEN, said means for recognizing hand-written words further comprises:
means for centering window $W_{nxm}$ around said character;
means for determining whether three character recognitions have been made;
IF three said recognitions have been made, THEN, said means for recognizing hand-written words further comprises:
means for comparing said three character recognitions by voting;
means for selecting said character with more than two appearances;
means for saving selected character in memory; and
means for determining whether the last said character of a said word has been recognized and saved;
IF said last character has been recognized and saved, THEN, said means for recognizing hand-written words further comprises:
means for extracting length of said word;
means for defining the starting character of said word; and
means for matching said word with lexicon database;
OTHERWISE; said means for recognizing hand-written words further comprises:
means for re-implementing said means for comparing said three character recognitions by voting;
OTHERWISE; said means for recognizing hand-written words further comprises:
means for re-implementing said means for determining whether a character is NOT isolated from adjacent characters;
OTHERWISE; said means for recognizing hand-written words further comprises:
means for implementing out-of-sequence said means for saving said selected character in memory.

19. Apparatus as in claim 12, wherein said means for saving the coordinates of lines of text and paragraphs on a given page further comprises:
means for saving the coordinates (x,y) and the relative orientation (rv) of the first character frame of each text line relative to the borders of the document page; and
means for interrelating the blocks of said extracted lines of text with numbers according to their relative positions on said document page.

20. Apparatus as in claim 12, wherein said means for extracting images from a page further comprises:
means for sequentially scanning said image region;
means for saving said coordinates (x,y) of said image; and
means for saving said relative orientation (rv) of said image.

21. Apparatus as in claim 12, wherein said string "S" is represented by:

$$S=cn_{k1}(dj_{k1})n_{k2}(dj_{k2})\ldots cn(dj_{ll})\ldots n_{lm}(dj_{lm})cc$$

wherein $n_{km} \in Z$, $dj_{km} \in \{1,2,3,4,5,6,7,8\}$, c=0, cc=9, and i,j,k,l,m $\in$ Z.

22. Apparatus as in claim 13, wherein said means for converting said string "S" into graph "G" is represented by:

$$f:S \rightarrow G=N_1 a^r{}_{12} N_2 a^r{}_{23} N_3 \ldots a^r{}_{nk} N_k;$$

wherein said line segment (SL or CL) corresponds to a graph node:

$$f:SL_i \rightarrow N_i \text{ or } CL_j \rightarrow N_j;$$

wherein each said graph node $N_1$ represents the properties of the corresponding segment:
$N_i$={Realtive Starting Point (SP), Length (L), Direction (D), Curvature (K)};
wherein each arc $a^r{}_{ij}$ represents the relationships between segments:
$a^r{}_{ij}$={connectivity (co), parallelism (p), symmetry (sy), relative size (rs), relative distance (rd), relative orientation (ro), similarity (si), . . . }, r $\in$ {co, p, sy, rm, rd, si}; and
wherein the actual matching process, each said node $N_i$ has only property in the curvature (K).

* * * * *